(12) United States Patent
Harada

(10) Patent No.: US 6,702,241 B2
(45) Date of Patent: Mar. 9, 2004

(54) CUP HOLDER

(75) Inventor: Akinori Harada, Sagamihara (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/136,273

(22) Filed: May 2, 2002

(65) Prior Publication Data

US 2002/0171018 A1 Nov. 21, 2002

(30) Foreign Application Priority Data

May 18, 2001 (JP) .................................. 2001-149353

(51) Int. Cl.[7] .............................................. A47K 1/08
(52) U.S. Cl. .................... 248/311.2; 224/926; 224/483
(58) Field of Search ......................... 248/311.2, 346.06, 248/292.12, 292.13, 222.13; 296/37.12; 224/926, 483

(56) References Cited

U.S. PATENT DOCUMENTS

| | | | |
|---|---|---|---|
| 4,981,277 A | * | 1/1991 | Elwell ..................... 248/311.2 |
| 5,072,989 A | * | 12/1991 | Spykerman et al. ... 297/188.16 |
| 5,259,580 A | * | 11/1993 | Anderson et al. ......... 248/311.2 |
| 5,395,084 A | * | 3/1995 | Ikuma ..................... 248/311.2 |
| 5,487,519 A | * | 1/1996 | Grabowski ............... 248/311.2 |
| 5,505,417 A | | 4/1996 | Plocher |
| 5,692,658 A | * | 12/1997 | Fischer et al. .............. 224/281 |
| 5,692,718 A | | 12/1997 | Bieck |
| 5,762,307 A | * | 6/1998 | Patmore ................... 248/311.2 |
| 5,820,094 A | * | 10/1998 | Tanaka .................... 248/311.2 |
| 5,876,007 A | | 3/1999 | Lancaster et al. |
| 5,890,692 A | * | 4/1999 | Lee et al. ................. 248/311.2 |
| 5,944,240 A | | 8/1999 | Honma |
| 6,010,047 A | * | 1/2000 | Osborn ....................... 224/281 |
| 6,024,395 A | | 2/2000 | Kang |
| 6,250,527 B1 | * | 6/2001 | Mizue et al. ................ 224/281 |
| 6,253,975 B1 | * | 7/2001 | Ichioka et al. .............. 224/281 |
| 6,349,913 B1 | * | 2/2002 | Jankowski ................ 248/311.2 |
| 6,450,468 B1 | * | 9/2002 | Hamamoto ............... 248/311.2 |

FOREIGN PATENT DOCUMENTS

EP  1 033 283  9/2000

* cited by examiner

*Primary Examiner*—Korie Chan
*Assistant Examiner*—Ingrid Weinhold
(74) *Attorney, Agent, or Firm*—Kanesaka & Takeuchi

(57) ABSTRACT

The cup holder includes a case and a holder main body. The holder main body includes a bottom wall, a rear opening, a cup mounting member, and a forcing device. The cup mounting member has a rear plate which closes the rear opening in the retracted position, and a mounting plate which closes the bottom opening in the retracted position and aligns vertically with the bottom wall in the forward position. The case has a pressing part which in the stored position presses the cup mounting member toward the forward position in opposition to the force of the forcing device. The holder main body can be stored inside the case without obstruction to a device positioned inside the case.

9 Claims, 6 Drawing Sheets

CUP HOLDER

BACKGROUND OF THE INVENTION AND RELATED ART STATEMENT

This invention relates to a cup holder, which is made so that a holder main body can be stored inside a case without obstruction to a device, and the like, which is positioned near the case.

In the past, there was a cup holder which was made so as to be folded inwardly from the respective left and right holding portions (Japanese Patent No. 2624633).

However, in the above-mentioned cup holder of the past, it was possible to reduce the width in the left and right directions by folding into two, but there was a problem that the length in the forward-backward direction did not change even when it is folded. Also, in the above-mentioned cup holder of the past, there was a problem that the height in the vertical direction was increased by folding into two.

That is, when parts or devices were stored at the inner side of the case, it was necessary to shorten the length of the holder main body in the forward-backward direction, and also to reduce the amount of sliding.

However, when the length of the holder main body in the forward-backward direction was shortened and the amount of sliding was reduced, there was a problem that the amount of drawing would become reduced and only a small cup could be supported.

The present invention has been made to obviate the above-mentioned problems of the prior art, and the purposes are in the following points.

Namely, in the first aspect of the invention, the holder main body can be stored inside the case without obstruction to a device, parts and the like, which is positioned at the inner side of the case, by advancing the rear wall of the holder main body when it is stored inside the case. When the holder main body is drawn out, the cup insertion hole can be enlarged by retracting the rear wall, and a large cup, such as a PET bottle, can be supported.

The invention described in the second aspect has the following purpose in addition to the above-mentioned purpose of the invention described in the first aspect. Namely, the invention is made so that the cup mounting member can be stored by rotation.

The invention described in the third aspect has the following purpose in addition to the above-mentioned purpose of the invention described in the first or second aspect. Namely, the invention is made so that the movement of the cup mounting member can be performed smoothly. As a result, the operating force when pushing the holder main body toward the stored position can be alleviated.

The invention described in the fourth aspect has the following purpose in addition to the above-mentioned purposes of the invention described in the first to third aspects. Namely, the invention is made so that the device, parts and the like can be stored in the storage space of the case.

The invention described in the fifth aspect has the following purpose in addition to the above-mentioned purpose of the invention described in the first to fourth aspects. Namely, the invention is made so that rattling of the cup can be prevented by a stopper.

Further objects and advantages of the invention will be apparent from the following description of the invention.

SUMMARY OF THE INVENTION

The cup holder to be used in a vehicle in the first aspect of the invention is constituted by a case, and a holder main body. The holder main body is held in the case so as to be capable of sliding, and has a stored position in which it is stored inside the case and a drawn-out position in which it is drawn out from the case. The holder main body has a cup insertion hole in which a cup can be inserted in the drawn-out position.

The holder main body is constituted by a bottom wall, a rear opening, a bottom opening, a cup mounting member, and forcing means. A cap (not illustrated) is mounted on the bottom wall. The rear opening is formed on the side of the interior. The bottom opening is continuous with the rear opening and is formed by cutting out a part of the bottom wall.

The cup mounting member is supported so as to be capable of forward and backward movements with respect to the holder main body, and it has a retracted position which faces the cup insertion hole and a forward position which projects out into the cup insertion hole. The forcing or urging means, i.e. spring, urges the cup mounting member toward the retracted position.

The cup mounting member is constituted by a rear plate, and a mounting plate. The rear plate blocks the rear opening in the retracted position. The mounting plate blocks the bottom opening in the retracted position and aligns vertically with the bottom wall in the forward position.

Also, the case has a pressing part. The pressing part in the stored position presses the cup mounting member toward the forward position in opposition to the force of the forcing means, i.e. spring.

The invention described in the second aspect has the following characteristics in addition to the above-mentioned characteristics in the first aspect. Namely, the cup mounting member is supported so as to be capable of rotation on the holder main body.

The invention described in the third aspect has the following characteristics in addition to the above-mentioned characteristics in the first and second aspects. Namely, there is a rib on one of the opposing faces of the mounting plate of the cup mounting member and the bottom wall of the holder main body. The rib reduces the frictional resistance between the two faces of the mounting plate of the cup mounting member and the bottom wall of the holder main body.

The invention described in the fourth aspect has the following characteristics in addition to the above-mentioned characteristics of the first to third aspects. Namely, there is a storage space at the back of the pressing part. In the storage space, a device, parts and the like, can be retained.

The invention described in the fifth aspect has the following characteristics in addition to the above-mentioned characteristics of the first to fourth aspects. Namely, there is a guide on the holder main body. The guide projects elastically toward the cup insertion hole.

DETAILED DESCRIPTION OF THE PREFERRED EMBODIMENT

Figure 1:
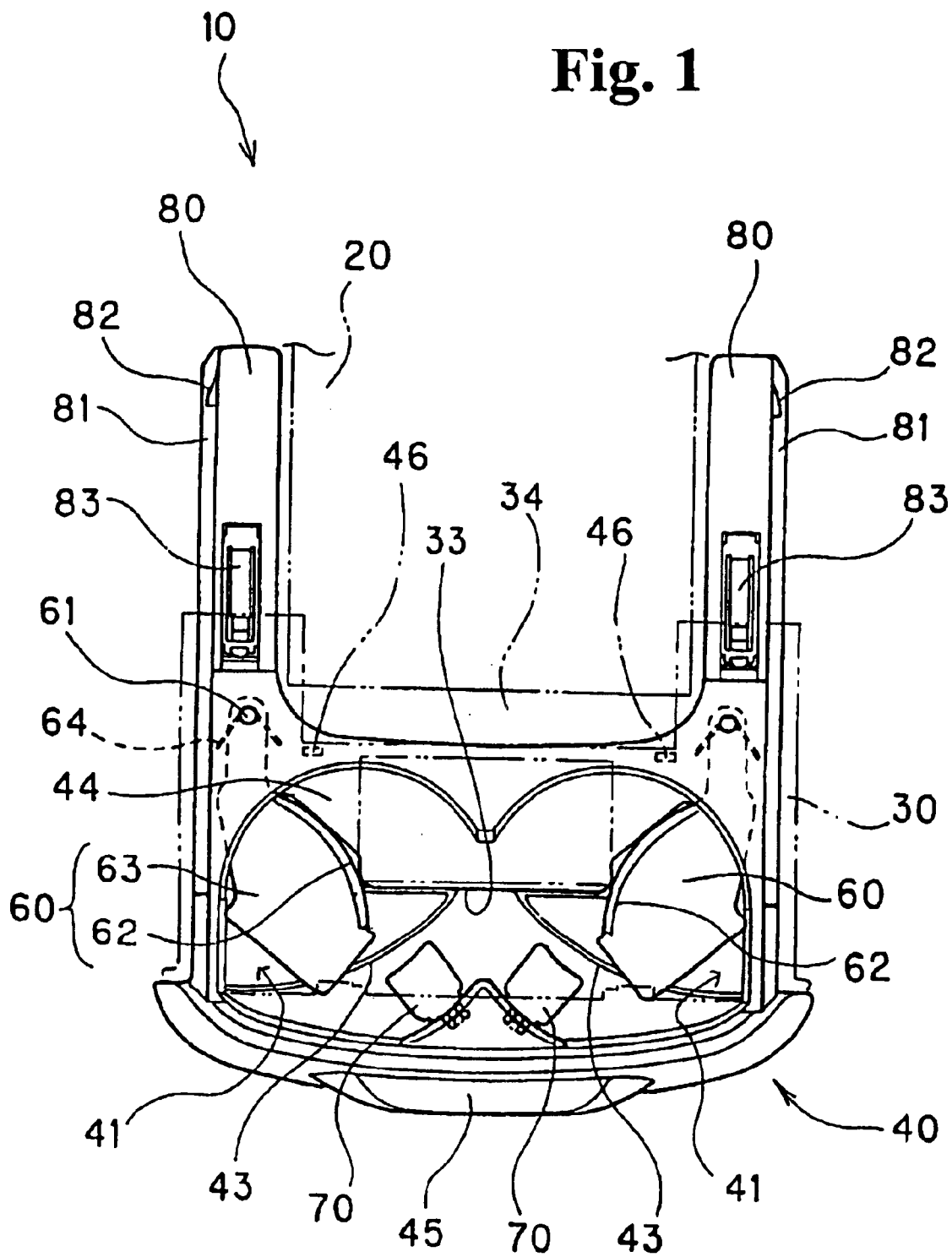
FIG. 1 is a plan view showing a stored state of the cup holder.
Figure 2:
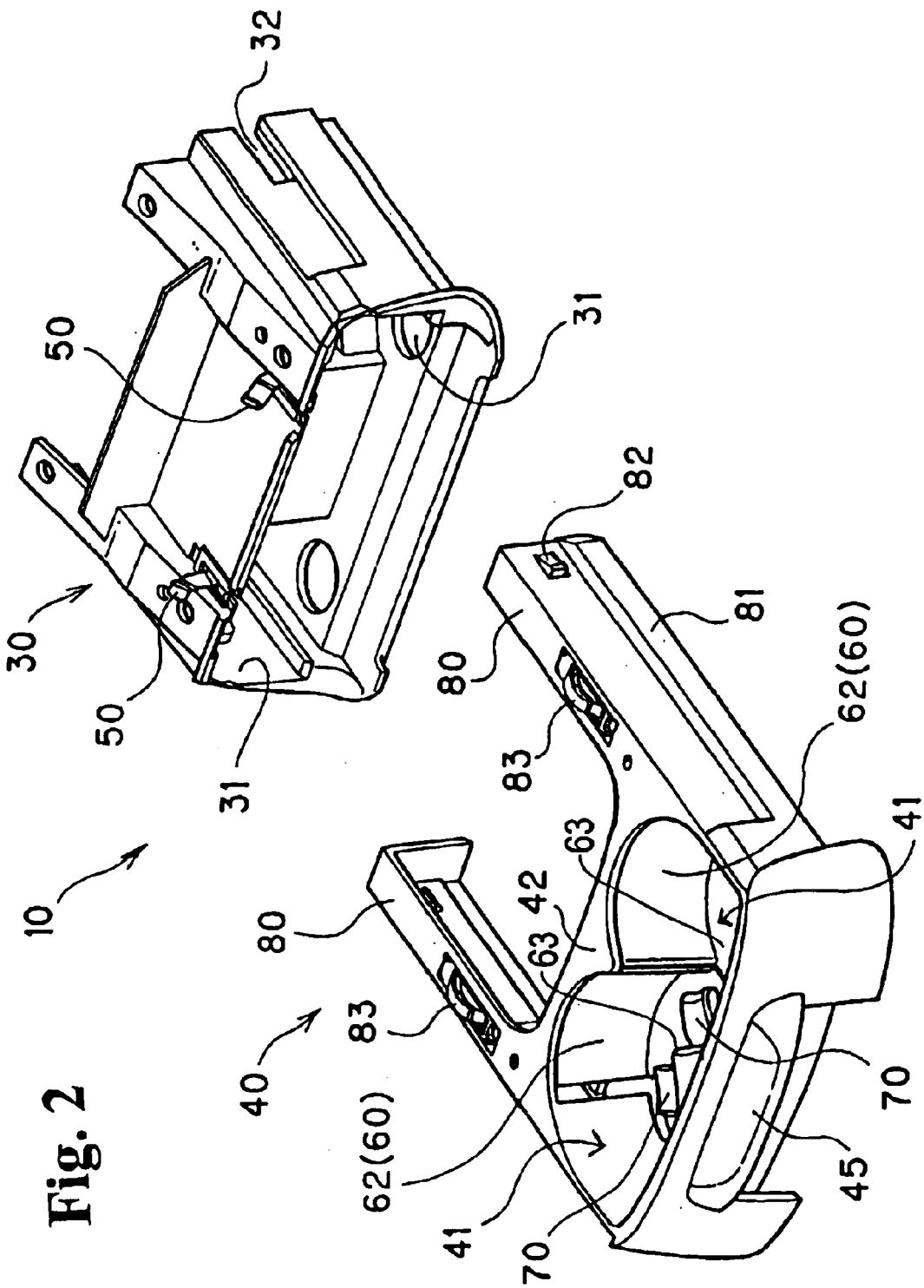
FIG. 2 is a perspective view of the cup holder in a separated state.
Figure 3:
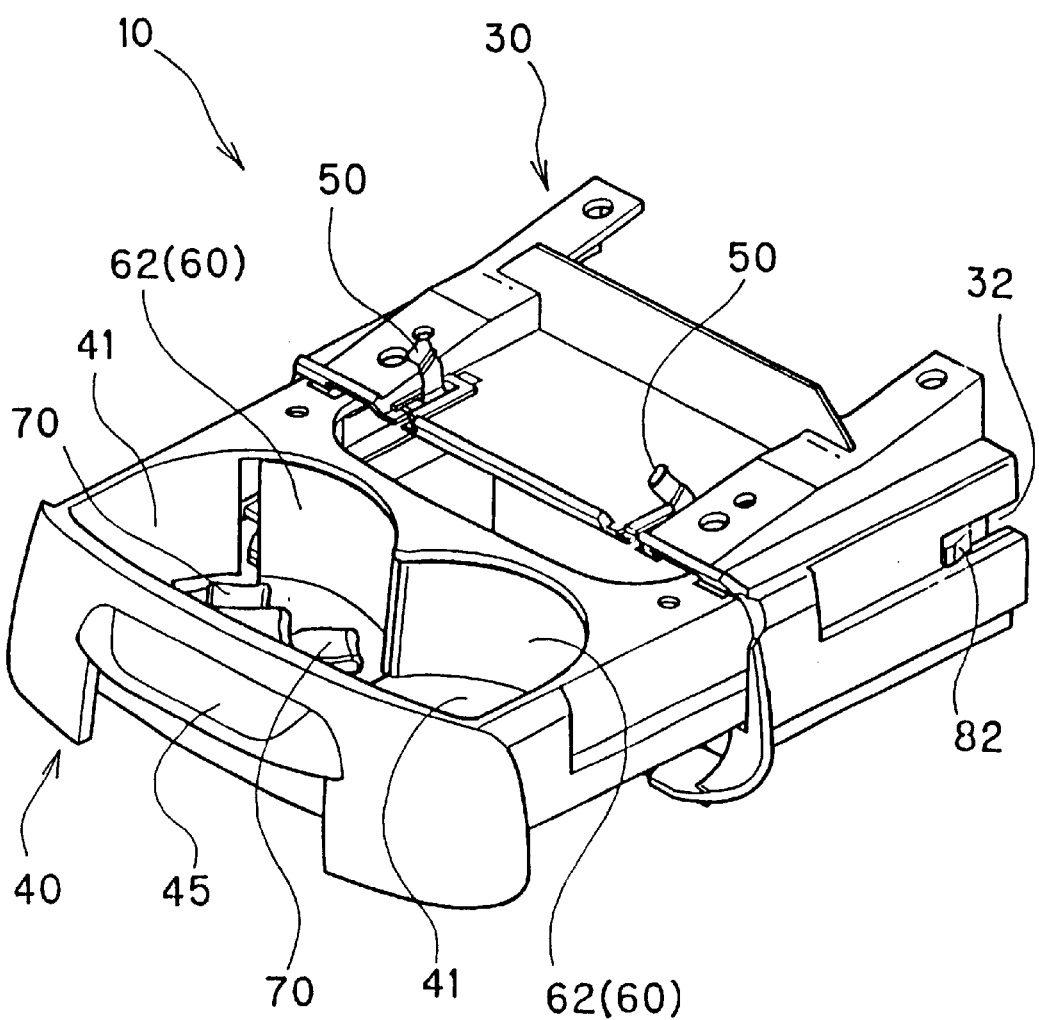
FIG. 3 is a perspective view showing a drawn-out state of the cup holder.
Figure 4:
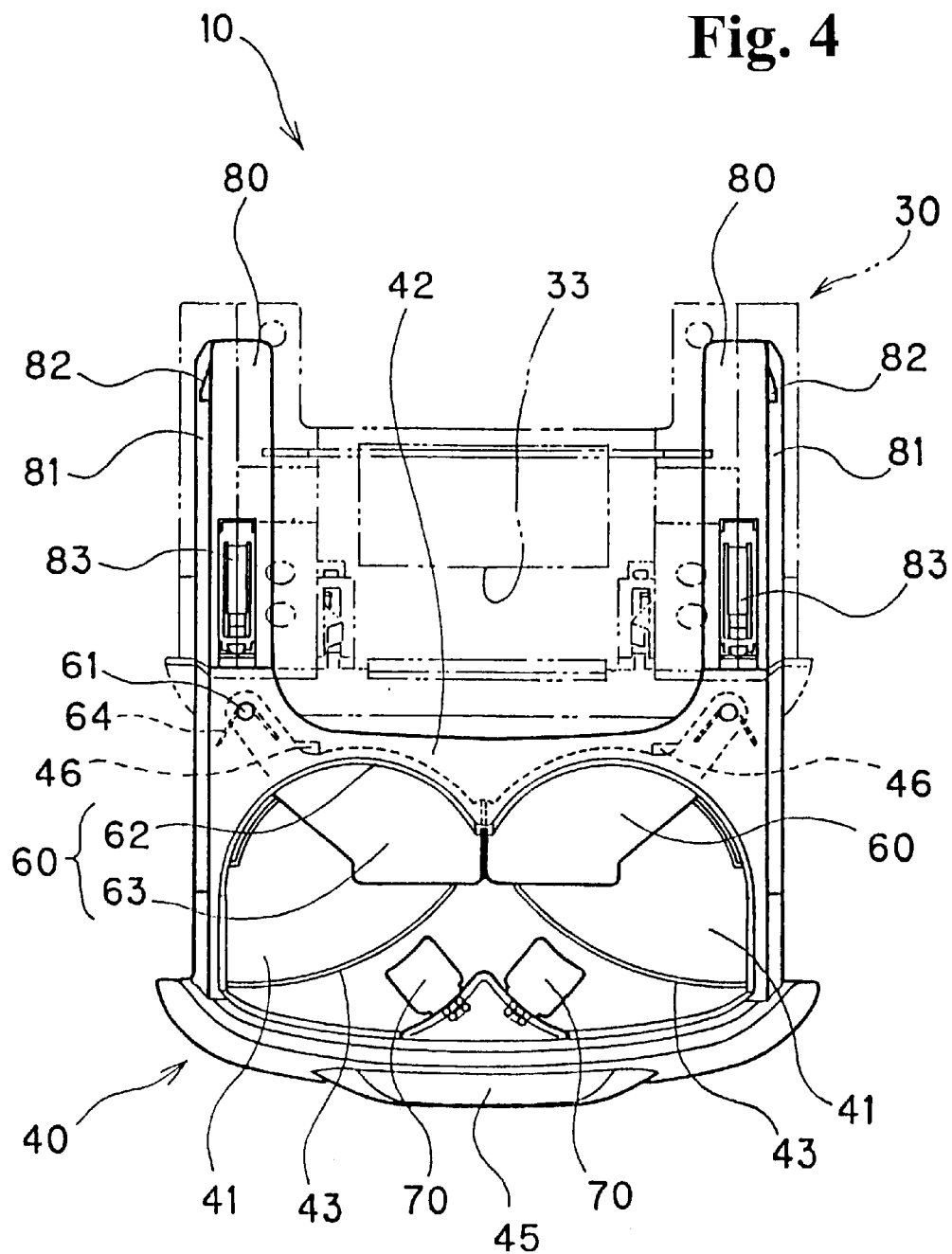
FIG. 4 is a plan view showing the drawn-out state of the cup holder.
Figure 5:
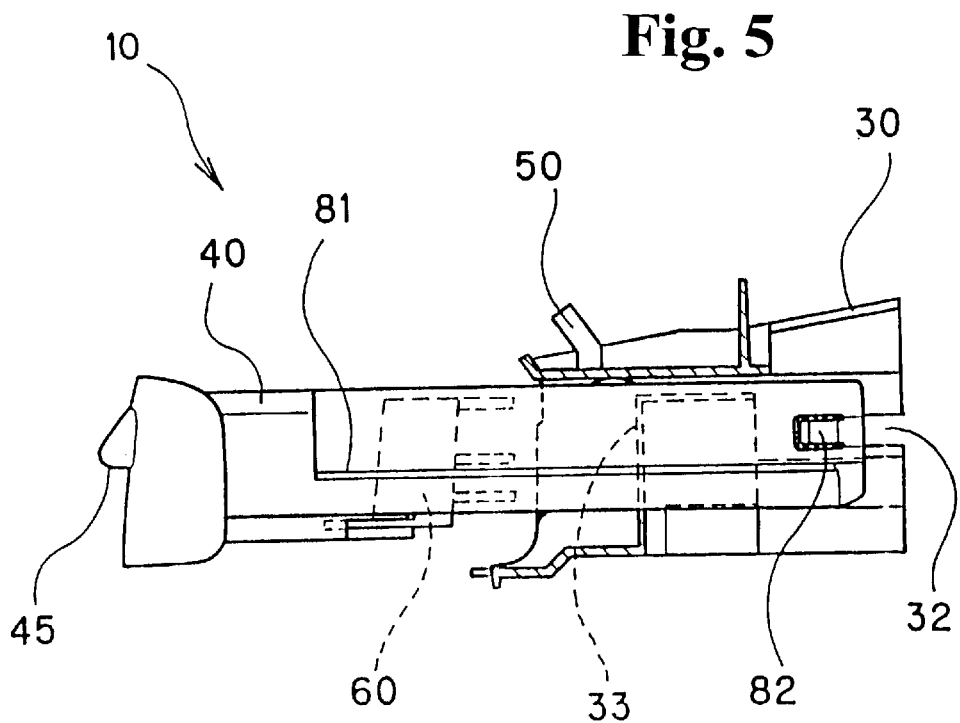
FIG. 5 is a side view showing the drawn-out state of the cup holder.
Figure 6:
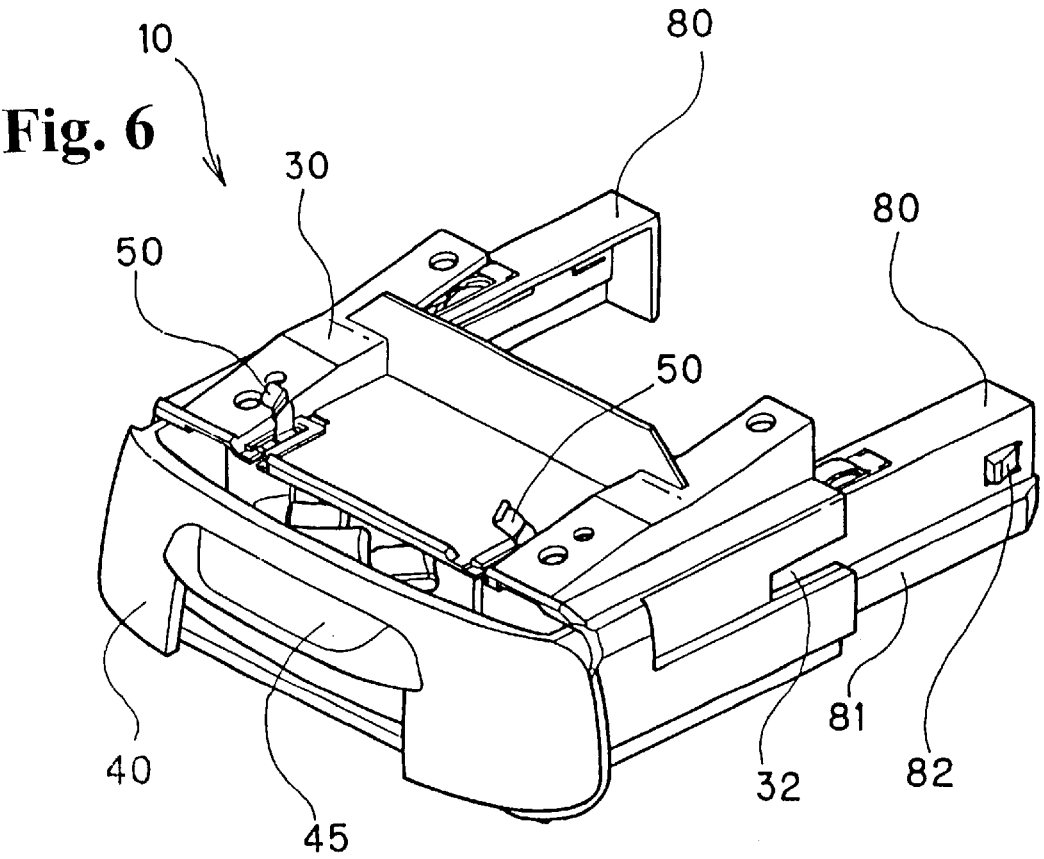
FIG. 6 is a perspective view showing the stored state of the cup holder.
Figure 7:
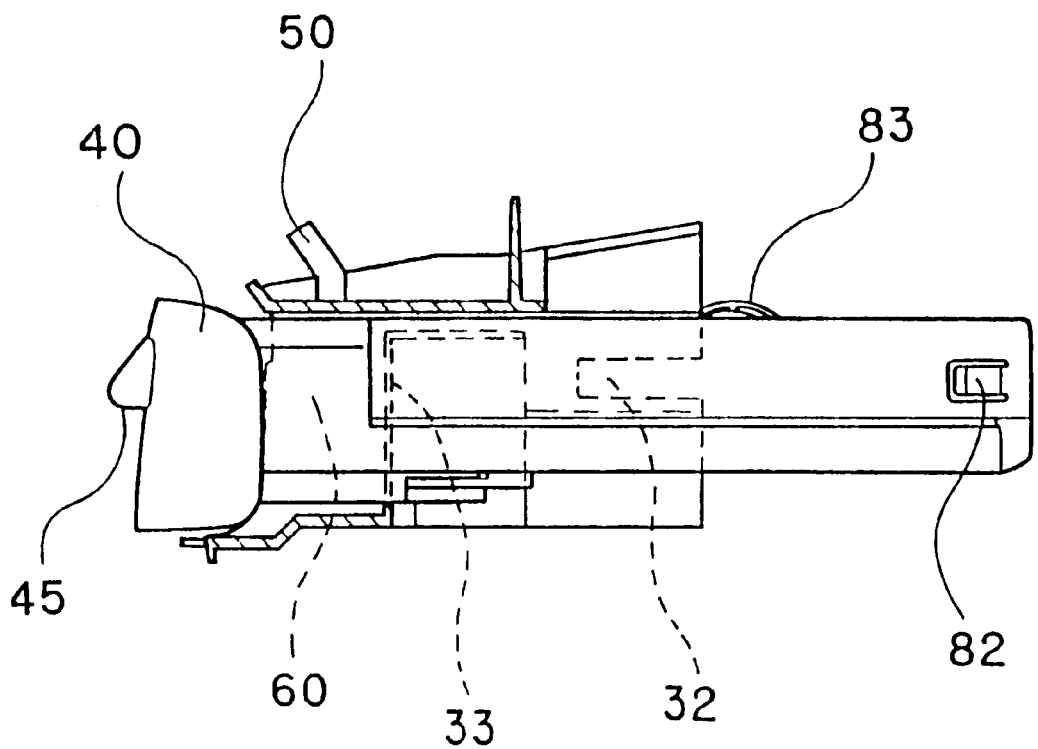
FIG. 7 is a side view showing the stored state of the cup holder.

FIGS. 1–7 show an example of the present invention. FIG. 1 is a plan view showing a stored state of the cup holder. FIG. 2 is a perspective view of the cup holder in a separated state. FIGS. 3–5 respectively show the drawn-out state of the cup holder, wherein FIG. 3 is a perspective view, FIG. 4 is a plan view, and FIG. 5 is a side view. FIGS. 6 and 7 respectively show the stored state of the cup holder, wherein FIG. 6 is a perspective view, and FIG. 7 is a side view.

In the drawings, 10 indicates the cup holder. Although not illustrated, the cup holder 10 is fixed, for example, on a center console of the automobile facing the rear seat. Also, as shown in FIGS. 3–5, the cup holder 10 is used by drawing out toward a user, and although not illustrated, it is capable of inserting a cup in the drawn-out position. The above-mentioned cup includes cans, PET bottles, and the like, in addition to tumblers.

The fitting position of the cup holder 10 is not limited to the center console of the automobile, and it also may be the instrument panel, arm rest, and the like. Also, the cup holder 10 is fixed to face the rear seat, but it also may be fixed to face the driver seat or the front passenger seat.

A device, parts and the like 20 is retained inside the above-mentioned center console, and as shown in FIG. 1, the device 20 is disposed at the inner side of the cup holder 10. Although not illustrated, the above-mentioned device 20, for example, contains a VSC sensor. The VSC sensor is a G sensor for vehicle running stability, and it is affixed at the center of gravity of the vehicle. The device 20 is not limited to the VSC sensor, and it also may be another device.

Specifically, as shown in FIG. 2, the cup holder 10 generally has a case 30, and a holder main body 40. As shown in FIG. 2, the case 30 is formed in a hollow box shape opened on the front face. Also, the case 30 is integrally formed from a thermoplastic resin having sufficient rigidity, for example ABS, and the like.

Specifically, as shown in FIG. 2, the case 30 has a front opening, a bottom plate, left and right side plates, a top plate, and an inner or back plate. As shown in FIG. 3, the holder main body 40 moves in and out through the front opening.

As shown in FIG. 2, the side plates are a pair, left and right, and each side plate has a guide groove 31 and cut-out part 32. As shown in FIG. 2, the guide groove 31 is provided along the sliding direction of the holder main body 40, and it is used for retaining the holder main body 40 to be capable of sliding. As shown in FIG. 2 and FIG. 3, the cut-out parts 32 are formed respectively on the left and right side plates, and they restrict the most forward position of the holder main body.

As shown in FIG. 2, the top plate has a pair of left and right fittings 50. The fittings 50 are attached to both the left and right sides of the top plate. Although not illustrated, the fittings 50 are used for fitting an ash tray which is attached to the center console.

Although not illustrated, the inner or back plate partially blocks the rear face of the case 30. Specifically, as shown in FIG. 1, the inner plate has a pressing part 33, and forms a storage space 34. As shown in FIG. 1, the pressing part 33 presses the cup mounting members 60 of the holder main body 40, to be described later, in the stored positions. As shown in FIG. 1, the storage space 34 is positioned on the inner side of the pressing part 33, that is, in the interior of the case 30, wherein the device 20 is inserted.

The holder main body 40 is integrally formed from a thermoplastic resin having sufficient rigidity and elasticity, for example ABS, and the like. Specifically, as shown in FIG. 2, the holder main body 40 has a pair of left and right cup insertion holes 41, a pair of left and right mounting members 60, a pair of left and right guides 70, and a pair of left and right arms 80.

As shown in FIG. 2, the cup insertion holes 41 are formed as a pair, left and right, and are divided to left and right by a dividing wall 42. Each cup insertion hole 41 is capable of receiving a cup (not illustrated) in the drawn-out position shown in FIGS. 3–5. The cup insertion holes 41 are formed as a pair, left and right. However, one insertion hole may be formed.

Specifically, as shown in FIG. 1, the cup insertion hole 41 has a bottom wall, a front wall, left and right side walls, and a rear opening. As shown in FIG. 1, the bottom wall has a rib 43, and a bottom opening 44. The rib is used for reducing frictional resistance with the lower face of the cup mounting member 60. Specifically, as shown in FIG. 4, the rib 43 is formed in an arc shape along a track of rotation of the cup mounting member 60.

The rib 43 is formed on the bottom wall, but it is not limited to this. The rib 43 may be formed on the lower face of the mounting plate 63 of the cup mounting member 60, or the both bottom wall and the lower face of the cup mounting member 60.

As shown in FIG. 1, the bottom opening 44 is continuous with the rear opening, and it is formed by cutting a part of the bottom wall.

As shown in FIG. 4, the front wall has a pull tab 45. The pull tab 45 is positioned in the center of the front face of the front wall, and it is used for pulling out the holder main body 40. Incidentally, the holder main body 40 was made so as to be pulled out by hand, but it is not limited to this, and it also may be made so as to be projected by projecting means, such as a spring.

As shown in FIG. 1, the rear opening has a pair of left and right stoppers 46. As shown in FIG. 1, the stoppers 46 project as a pair, left and right, from the dividing wall 42. Each stopper 46 meets with the cup mounting member 60 in order to restrict the most retracted position of the cup mounting member 60.

The cup mounting member 60 is integrally formed from a thermoplastic resin having sufficient rigidity, for example ABS, and the like. Specifically, as shown in FIG. 1, the cup mounting member 60 has the a rotating shaft 61, a rear plate 62, a mounting plate 63 and forcing means, i.e. spring 64.

The rotating shaft 61 is supported so as to be capable of rotating on the holder main body 40. The cup mounting member 60 is capable of rotation by the rotating shaft 61, but it is not limited to this, and it also may be made so as to slide forward and backward.

The rear plate 62 closes the rear opening of the holder main body 40 in the retracted position as shown in FIG. 4. The mounting plate 63 blocks the bottom opening 44 of the holder main body 40 in the retracted position shown in FIG. 4, and moves to the forward position shown in FIG. 1.

The spring 64 functions as forcing or urging means which urges the cup mounting member 60 toward the retracted position shown in FIG. 4 around the rotating shaft 61. The forcing means is not limited to the spring 64, and a plate spring, and the like, may be used.

As shown in FIG. 1 and FIG. 2, the guides 70 are a pair, left and right, and each guide 70 projects elastically toward the respective cup insertion hole 41. Specifically, although not illustrated, each guide 70 has a support shaft and a spring (urging means). The support shaft is supported on the perimeter of the cup insertion hole 41, and the guide 70 rotates vertically on the support shaft. The spring urges the guide 70 upward, that is, toward the horizontal position.

Although not illustrated, when a cup is inserted into the cup insertion hole 41, each guide 70 is pushed by the cup, and rotates downward around the support shaft in opposition to the returning force of the spring. Each guide 70 elastically abuts against the perimeter of the cup by the force of the spring, and prevents rattling of the cup inside the cup insertion hole 41.

As shown in FIG. 1 and FIG. 2, the arms 80 are formed as a pair, left and right, extending backward from the left and right side walls. As shown in FIG. 1 and FIG. 2, each arm 80 has a guide rail 81, an elastic hook 82 and a plate spring (meeting member). The guide rails 81 are inserted into the respective left and right guide grooves 31 of the case 30.

As shown in FIG. 1 and FIG. 2, the elastic hooks 82 are positioned respectively on the rear ends of the left and right arms 80, and they restrict the most forward position of the holder main body 40 by meeting with the left and right cut-out parts 32 of the case 30.

As shown in FIG. 1 and FIG. 2, the plate springs 83 are attached respectively on the upper faces of the left and right arms 80, and they function as meeting members which elastically meet respectively with the upper faces of the guide grooves 31 of the case 30. The plate springs 83 prevent unintentional sliding of the holder main body 40. The meeting members are not limited to the plate springs 83, and cushions also may be used.

Next, the cup holder 10 having the above-mentioned constitution is used in the following manner.

First, as shown in FIG. 1, FIG. 6, and FIG. 7, in the stored position of the holder main body 40, the pull tab 45 may be gripped with the fingers and pulled toward the user from the case 30. When the holder main body 40 is pulled out toward the user, as shown in FIGS. 3–5, the cup mounting members 60 are retracted by the rotations around the rotating shafts 61 by the forces of the springs 64.

As shown in FIG. 4, the cup mounting members 60 stop at the most retracted positions by meeting with the stoppers 46 on the holder main body 40. In the most retracted positions, the rear opening of the holder main body 40 is blocked by the rear plates 62 of the cup holding members 60, and in addition, the bottom opening 44 of the holder main body 40 is blocked by the mounting plates 63.

On the other hand, although not illustrated, when the cup is inserted into the cup insertion hole 41, the bottom of the cup is mounted on the upper face of the bottom wall of the holder main body 40 and the upper face of the mounting plate 63 of the cup mounting member 60.

When storing the holder main body 40, as shown in FIG. 1, FIG. 6, and FIG. 7, it may be pushed into the case 30. When the holder main body 40 is pushed in, as shown in FIG. 1, the cup mounting members 60 are pushed relatively by the pressing part 33 of the case 30, and they advance forward by rotating around the rotating shafts 61.

Because the present invention is constituted in the above manner, it performs effects as described below. By the invention described in the first aspect, the holder main body can be stored inside the case without obstruction to the device, parts and the like, which is positioned near the inner side of the case, by advancing the rear wall of the holder main body when stored inside the case. When the holder main body is drawn out, the cup insertion hole can be enlarged by retraction or movement of the rear wall, and a large cup, such as a PET bottle, can be supported.

By the invention described in the second aspect, in addition to the above-mentioned effects, the cup mounting member can be stored by rotation. By the invention described in the third aspect, in addition to the effects described in the first or second aspect, the movement of the cup mounting member can be performed smoothly. As a result, the operating force when pushing the holder main body toward the stored position can be alleviated.

By the invention described in the fourth aspect, in addition to the effects described in the first to third aspects, the device can be stored in the storage space of the case. By the invention described in the fifth aspect, in addition to the effects described in the first to fourth aspect, rattling of the cup can be prevented by a stopper.

While the invention has been explained with reference to the specific embodiments of the invention, the explanation is illustrative and the invention is limited only by the appended claims.

What is claimed is:

1. A cup holder comprising:

a case having a pressing part therein, and a holder main body slidably held in the case, and having a stored position in which said holder main body is stored in the case and a drawn-out position in which said holder main body is substantially drawn out from the case, said holder main body including a cup insertion hole in which a cup can be inserted at the drawn-out position; a bottom wall for partly supporting the cup in the cup insertion hole, said bottom wall having a bottom opening; a rear opening opened to an interior side; a cup mounting member rotatably disposed inside the holder main body, and having a rear plate and a mounting plate extending perpendicularly to the rear plate, said cup mounting member having a retracted position in which the rear plate closes the rear opening and the mounting plate is located in the bottom opening and a forward position in which the rear plate is located in the cup insertion hole; and urging means for urging the cup mounting member toward the retracted position, wherein in the stored position, said pressing part of the casing passes through the rear opening and presses the cup mounting member toward the forward position in opposition to a force of the urging means.

2. A cup holder according to claim 1, wherein said bottom opening is continuous with said rear opening and formed as a part of the bottom wall, said mounting plate partly blocking the bottom opening in the retracted position.

3. A cup holder according to claim 1, wherein said cup mounting member is rotatably supported on the holder main body.

4. A cup holder according to claim 1, further comprising a rib formed on one of opposing faces of the mounting plate of the cup mounting member and the bottom wall of the holder main body for reducing frictional resistance of the two faces.

5. A cup holder according to claim 1, wherein said case provides a utility space at a back of the pressing part.

6. A cup holder according to claim 1, wherein said holder main body further includes a guide elastically projecting toward the cup insertion hole.

7. A cup holder according to claim 1, wherein said holder main body further includes two arms projecting rearwardly on two sides thereof, and a utility space between the two arms, said case having two guides for slidably receiving the two arms.

8. A cup holder according to claim 1, wherein said cup mounting member moves between the retracted position and the forward position inside the holder main body without projecting laterally outside the holder main body.

9. A cup holder according to claim 8, wherein said rear plate moves forwardly and laterally when the cup mounting member moves from the retracted position to the forward position.

* * * * *